(12) United States Patent
Wesstrom et al.

(10) Patent No.: US 8,649,641 B2
(45) Date of Patent: Feb. 11, 2014

(54) LIGHT WAVE GUIDE WITH LOW REFLECTIVITY

(75) Inventors: Jan-Olof Wesstrom, Stockholm (SE); Dave Adams, Stockholm (SE)

(73) Assignee: Syntune AB, Kista (SE)

( * ) Notice: Subject to any disclaimer, the term of this patent is extended or adjusted under 35 U.S.C. 154(b) by 66 days.

(21) Appl. No.: 13/319,339

(22) PCT Filed: May 11, 2010

(86) PCT No.: PCT/SE2010/050516
§ 371 (c)(1),
(2), (4) Date: Nov. 8, 2011

(87) PCT Pub. No.: WO2010/132013
PCT Pub. Date: Nov. 18, 2010

(65) Prior Publication Data
US 2012/0057817 A1  Mar. 8, 2012

(30) Foreign Application Priority Data

May 13, 2009  (SE) ........................................ 0950331

(51) Int. Cl.
*G02B 6/28* (2006.01)
(52) U.S. Cl.
USPC .................................. 385/24; 385/14; 385/48
(58) Field of Classification Search
USPC .................... 385/24, 129–132, 14, 31, 48–50
See application file for complete search history.

(56) References Cited

U.S. PATENT DOCUMENTS

| 4,172,631 | A |   | 10/1979 | Yevick |
| 5,029,981 | A | * | 7/1991 | Thompson ................... 359/572 |
| 5,630,004 | A | * | 5/1997 | Deacon et al. ............... 385/129 |
| 6,236,781 | B1 | * | 5/2001 | Doerr et al. .................... 385/37 |
| 6,289,147 | B1 | * | 9/2001 | Bulthuis et al. ................ 385/24 |
| 6,424,760 | B1 | * | 7/2002 | Katayama et al. .............. 385/24 |
| 6,512,864 | B1 | * | 1/2003 | Lin et al. ........................ 385/24 |
| 6,714,704 | B2 | * | 3/2004 | Lin et al. ........................ 385/37 |

(Continued)

FOREIGN PATENT DOCUMENTS

| EP | 1 840 607 A1 | 10/2007 |
| JP | 07174929 A | 7/1995 |

(Continued)

OTHER PUBLICATIONS

International Search Report dated Aug. 6, 2010, corresponding to PCT/SE2010/050516.

(Continued)

*Primary Examiner* — Ellen Kim
(74) *Attorney, Agent, or Firm* — Young & Thompson

(57) ABSTRACT

An optical light splitter includes or is connected to at least two input waveguides (4; 6, 7; 18, 19; 32,33) for light. The light splitter (1, 2, 30, 40), on the side opposite to the input waveguide or input waveguides (4; 6, 7; 18, 19; 32, 33; 41, 42) transitions into at most one output waveguide (8, 10, 20, 34) in the direction of propagation of the incoming light. A surface (14, 25, 31, 45) is present set at an angle to the direction of propagation of the light in that part of the light splitter that is opposite to the input waveguide or input waveguides, the surface is present where the light splitter has an image from incoming light, and internal corners are not present in the part.

4 Claims, 2 Drawing Sheets

(56) References Cited

U.S. PATENT DOCUMENTS

| | | | |
|---|---|---|---|
| 6,842,560 B2 * | 1/2005 | Yamauchi et al. | 385/24 |
| 6,892,008 B2 * | 5/2005 | Singh et al. | 385/49 |
| 7,020,358 B2 * | 3/2006 | Tabuchi et al. | 385/24 |
| 7,286,733 B2 | 10/2007 | Watanabe | |
| 7,308,180 B2 * | 12/2007 | Fujii et al. | 385/129 |

FOREIGN PATENT DOCUMENTS

| | | |
|---|---|---|
| JP | 2001166160 A | 6/2001 |
| JP | 2003014963 A | 1/2003 |
| JP | 2004258677 A | 9/2004 |
| JP | 2005274962 A | 10/2005 |
| JP | 2006-32315 A | 11/2006 |
| WO | 95/05020 A1 | 2/1995 |
| WO | 0175492 | 10/2001 |
| WO | 2004/008207 A1 | 1/2004 |

OTHER PUBLICATIONS

R. Hanfoug et al., "Reduced reflections from multimode interference couplers", Electronics Letters, Apr. 13, 2006, vol. 42, No. 8.

E.C.M. Pennings et al., Reflection Properties of Multimode Interference Devices, IEEE Technology Letters, Jun. 1994, pp. 715-718, vol. 6, No. 6.

* cited by examiner

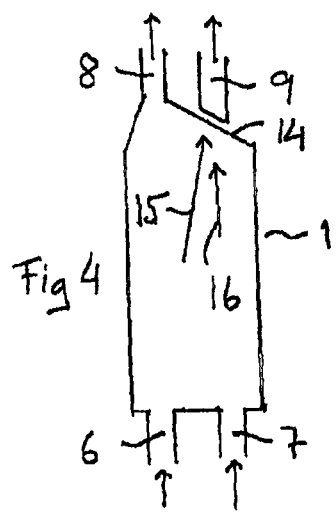
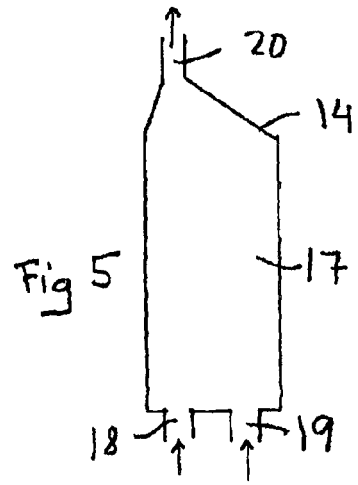
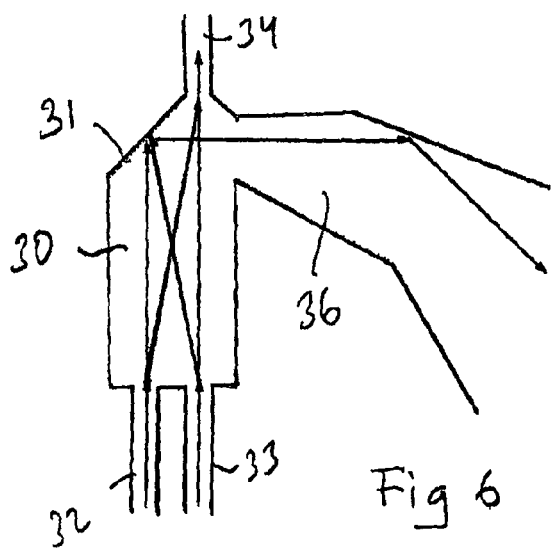
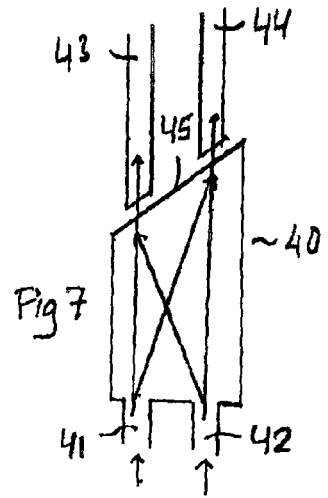

LIGHT WAVE GUIDE WITH LOW REFLECTIVITY

The present invention relates to a light guide with low reflection.

In waveguide optics light is sometimes split such that light enters a component in one or several waveguides and leaves the component through two or more outputs.

It is often desirable to maintain the reflections that pass back to the input waveguides at a low level. For this reason, surfaces are arranged that do not lie perpendicular to the direction of propagation of the light, particularly at the ends of the components, for example in the regions at the output waveguides, where the light has diverged such that it may, for example, be present to a certain extent between the waveguides.

An internal corner between the output waveguides arises in all of these cases. Such corners cause reflections, which in the worst case may transmit light back into the input waveguide. The more acute the corners are, the lower will be the reflections, but it is difficult to avoid a small rounding of the inner corners, due to the resolution of typical lithographical and etching methods. Thus, it is difficult totally to avoid reflections.

The present invention solves this problem.

The present invention thus relates to an optical light splitter that comprises or is connected to at least one input waveguide for light, and is characterised in that the light splitter, on the side opposite to the input waveguide or input waveguides transitions into at most one output waveguide in the direction of propagation of the incoming light, in that a surface is present set at an angle to the direction of propagation of the light in that part of the light splitter that is opposite to the input waveguide or input waveguides, and in that the said surface is present where the light splitter has an image from incoming light, and in that internal corners are not present in the said part.

Figure 1:
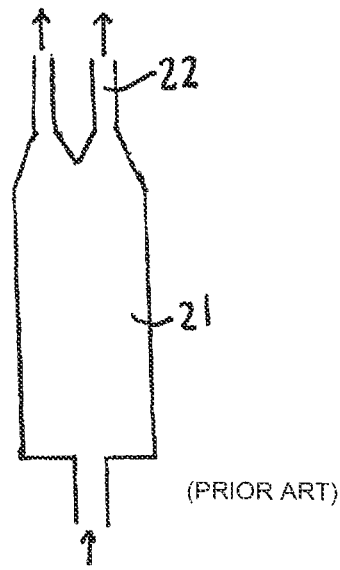
Figure 2:
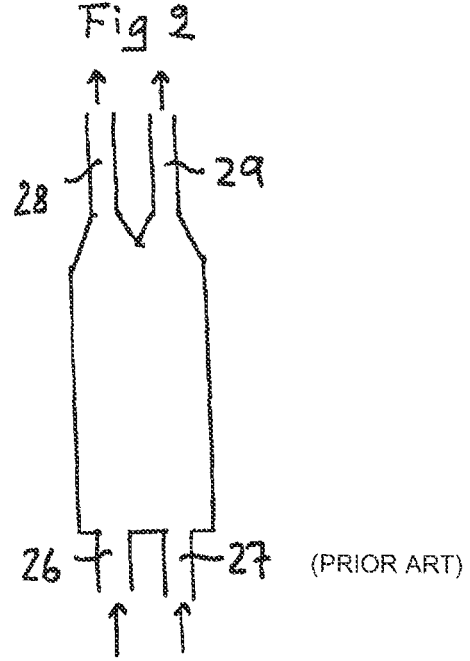
Figure 3:
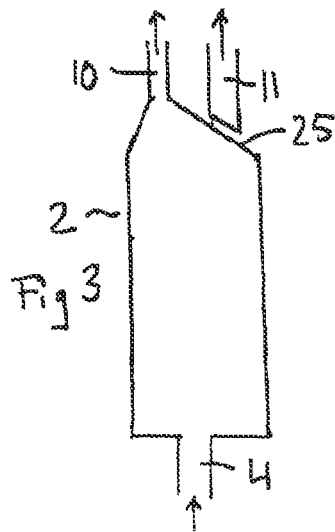

The invention will be described in more detail below, partly in association with embodiments of the invention shown in the attached drawings, where:

FIG. 1 shows a 1×2 MMI according to prior art technology
FIG. 2 shows a 2×2 MMI according to prior art technology
FIG. 3 shows a 1×2 MMI in which the invention is applied
FIG. 4 shows a 2×2 MMI in which the invention is applied
FIG. 5 shows a 2×2 MMI in which the invention is applied
FIG. 6 shows a 2×2 MMI in which the invention is applied
FIG. 7 shows a 2×2 MMI in which the invention is applied.

The present invention concerns an optical light splitter comprising one or two input waveguides for light.

According to the invention, the part of the light splitter that comprises the input waveguide or input waveguides transitions into at most one output waveguide in the direction of propagation of the incoming light.

Furthermore, a surface 14, 25, 31 is present set at an angle to the direction of propagation of the light in that part of the light splitter that lies opposite to the input waveguide or input waveguides, which surface is present where the light splitter has an image from the incoming light, and that internal corners are not present in the said part.

One highly preferred embodiment of the invention, concerns an optical light splitter 1, 2 comprising one 4 or two 6, 7 input waveguides for light and two output waveguides 8, 9; 10, 11 for light. The part of the light splitter 1, 2 that comprises or is connected to the input waveguide 4 or input waveguides 6, 7 transitions into one output waveguide 8, 10 at the most. Furthermore, a capture waveguide 9, 11 is arranged to capture light that exits from the light splitter at the location at which a second output waveguide would have been located at a distance from the light splitter 1, 2 and having the same direction as the said second output waveguide would have had.

FIG. 2 shows a conventional 2×2 MMI (Multi Mode Interferometer) with two input waveguides 26, 27 and two output waveguides 28, 29. The arrows in FIG. 2 show input and output light.

The MMI shown in FIG. 2 transmits half of the light from each of the input waveguides 26, 27 to the two output waveguides 28, 29. It can be used, for example, at the end of a Mach Zehnder interferometer, in which light from one of the output waveguides is the output signal from the Mach Zehnder. In this case, it is light from only one of the output waveguides that is of interest.

The light splitter shown in FIG. 2 according to the present invention can, in this use of the light splitter, be replaced by the light splitter 17 shown in FIG. 5 in which two input waveguides 18, 19 are present, but only a single output waveguide 20.

Thus the internal corner described in the introduction is avoided, whereby reflections are minimised.

According to one preferred embodiment, the light splitter 1 is a 2×2 MMI (Multi Mode Interferometer), see FIG. 4, where a continuous surface 14 is located placed at an angle to the direction of propagation 15, 16 of the light, which surface is present in the location at which the said second output waveguide 29 would have been placed.

FIG. 4 shows a 2×2 MMI. According to this design, a capture waveguide 9 is arranged to capture light that passes out from the light splitter at the location at which a second output waveguide 29 would have been located. The capture waveguide 9 is located at a distance from the light splitter 1 and in the same direction as the said second output waveguide 29 would have had.

The internal corner is avoided. Most of the light that would have passed into the said second output waveguide 29 is instead captured by the capture waveguide 9. The light propagates a short distance in the surrounding material, but is then captured. A capture waveguide 9 is particularly suitable when the reflection is small at the end of the MMI. The reflection is small, for example, in a shallowly etched ridge waveguide or in a buried heterostructure waveguide, where the contrast in effective index between the waveguide and the surrounding surface is small.

A 1×2 MMI 21, as is shown in FIG. 1, can, in the same way, be modified such that an output waveguide 22 is replaced by a capture waveguide 11, see FIG. 3. According to this design, a surface 25 is located at an angle to the direction of propagation of the light where the said second output waveguide 22 would have been located.

FIG. 7 shows a 2×2 MMI 40, where two input waveguides 41, 42 are present and where there is no output waveguide. There are, instead, two capture waveguides 43, 44 located close to the said angled surface 45. The capture waveguides 43, 44 are located at a distance from the light splitter 40 and in the same direction as the said second output waveguides would have had. The arrows show the direction of propagation of the light.

Thus internal corners against which incident light can be reflected are avoided in a 2×2 MMI and in a 1×2 MMI.

With respect to the MMIs, the invention can be applied in cases in which the light from the input waveguide or input waveguides has more than one image on the output side. It is a characteristic in this case that one or more output waveguides have been removed where one or more images are formed, such that certain images do not correspond to an output waveguide.

According to a highly preferred design, the capture waveguide 9, 11; 43, 44 that is arranged to capture light that exits from the light splitter is located at a distance from the light splitter of magnitude 0.1 to 10 micrometers.

According to an alternative design of a 2×2 MMI 30 according to the invention, shown in FIG. 6, a surface 31 is located arranged to constitute a side reflector at the location at which a first output waveguide 28 would have been placed. The 2×2 MMI 30 has two input waveguides 32, 33 and one output waveguide 34. The surface 31 is arranged to reflect light that is incident onto the surface 31 in a direction that is essentially perpendicular to the direction of propagation of the incident light such that the light leaves the MMI on the opposite side of the surface 31 into a multi-mode waveguide 36 that is an integral part of the light splitter 30 or that is connected to the light splitter 30.

The multi-mode waveguide 36 is relatively broad and leads the light to some form of low-reflection termination. Internal corners and the associated reflection are in this way avoided. A side reflector 31 is particularly suitable when the reflection in the termination of the MMI is large, for example in a deeply etched ridge waveguide, where the contrast in effective index between the waveguide and the surrounding surface is large.

According to one preferred design, the surface 31 is designed to be gently outwardly convex, i.e. convex in the upward direction in the figure.

It is obvious that the problem described in the introduction is solved by means of the present invention.

A number of embodiments have been described above. It is obvious that one skilled in the art can vary the detailed design without deviating from the innovative concept of designing the light splitter such that internal corners are avoided.

The present invention, therefore, is not to be considered to be limited to the embodiments specified above, since it can be varied within the scope specified by the attached patent claims.

The invention claimed is:

1. An optical light Multi Mode Interferometer (MMI) splitter comprising:
   a first end wall that receives light from at least one input waveguide, the light from the at least one input waveguide having a direction of propagation toward a second end wall of the splitter opposite the first end wall;
   a body between the first and second end walls that is arranged to form at least two images of the light from the at least one input waveguide; and
   the second end wall having a first interior surface, which is oblique to the direction of propagation, where a first of the at least two images is received, and a second interior surface, which abuts the first interior surface, where a second of the at least two images is received,
   wherein the second end wall does not have any interior corners that reflect the light from the at least one input waveguide toward the first end wall, and
   wherein the second end wall transitions into only one output waveguide, the only one output waveguide being arranged to output, in the direction of propagation, the second of the at least two images that is received at the second interior surface.

2. The splitter according to claim 1, further comprising a first capture output waveguide that is exterior to and spaced from the second end wall, the first capture output waveguide being arranged to output, in the direction of propagation, the first of the at least two images that is received at the first interior surface.

3. The splitter according to claim 2, wherein the first capture output waveguide is spaced 0.1 to 10 μm from the second end wall.

4. The splitter according to claim 1, further comprising a multimode waveguide that extends from the body in a direction transverse to the direction of propagation, and wherein the first interior surface is angled to reflect the first of the at least two images into the multimode waveguide.

* * * * *